(12) United States Patent
Gilbert et al.

(10) Patent No.: US 9,465,804 B1
(45) Date of Patent: Oct. 11, 2016

(54) TECHNIQUES FOR MANAGING SHORTCUT STORAGE

(75) Inventors: Andrew Gilbert, High Wycombe (GB); Michael Bilsborough, Berkshire (GB)

(73) Assignee: VERITAS TECHNOLOGIES LLC, Mountain View, CA (US)

( * ) Notice: Subject to any disclaimer, the term of this patent is extended or adjusted under 35 U.S.C. 154(b) by 912 days.

(21) Appl. No.: 12/578,050

(22) Filed: Oct. 13, 2009

(51) Int. Cl.
*G06F 17/30* (2006.01)
*G06F 11/14* (2006.01)

(52) U.S. Cl.
CPC ..... *G06F 17/30073* (2013.01); *G06F 11/1448* (2013.01)

(58) Field of Classification Search
CPC ........... G06F 11/1448; G06F 11/1458; G06F 17/30076
See application file for complete search history.

(56) References Cited

U.S. PATENT DOCUMENTS

| | | | |
|---|---|---|---|
| 6,944,815 B2 * | 9/2005 | Bierbrauer et al. | 715/200 |
| 7,165,059 B1 * | 1/2007 | Shah et al. | |
| 7,657,509 B2 * | 2/2010 | Clark | G06F 11/1448 707/999.003 |
| 2002/0143792 A1 * | 10/2002 | Belu | G06F 9/445 |
| 2004/0167941 A1 * | 8/2004 | Prahlad | G06F 17/30067 |
| 2005/0021566 A1 * | 1/2005 | Mu | 707/200 |
| 2005/0086231 A1 * | 4/2005 | Moore | 707/100 |
| 2007/0033237 A1 * | 2/2007 | Prahlad et al. | 707/204 |
| 2007/0179990 A1 * | 8/2007 | Zimran et al. | 707/201 |
| 2008/0034004 A1 * | 2/2008 | Cisler et al. | 707/200 |
| 2008/0104343 A1 * | 5/2008 | Miyagaki et al. | 711/158 |
| 2008/0109448 A1 * | 5/2008 | Aboel-Nil et al. | 707/10 |
| 2008/0133622 A1 * | 6/2008 | Brown | G06F 11/1458 |
| 2008/0250084 A1 * | 10/2008 | Polimeni | 707/204 |
| 2009/0063393 A1 * | 3/2009 | Saake | G06F 17/30073 |
| 2009/0182793 A1 * | 7/2009 | Love et al. | 707/206 |

* cited by examiner

*Primary Examiner* — Miranda Huang
(74) *Attorney, Agent, or Firm* — Wilmer Cutler Pickering Hale and Dorr LLP

(57) ABSTRACT

Techniques for managing shortcut storage are disclosed. In one particular exemplary embodiment, the techniques may be realized as a computer implemented method for managing shortcut storage comprising identifying a shortcut in data storage, determining whether at least one attribute associated with the shortcut meets a specified criteria, modifying the shortcut in the event that the at least one attribute meets the specified criteria.

20 Claims, 3 Drawing Sheets

TECHNIQUES FOR MANAGING SHORTCUT STORAGE

FIELD OF THE DISCLOSURE

The present disclosure relates generally to data archiving systems and, more particularly, to techniques for managing shortcut storage.

BACKGROUND OF THE DISCLOSURE

Data archiving systems may use shortcuts to manage the size of a data source such as, for example, email data. Archiving may allow a portion of a data source (e.g., older data) to be archived, which may remove the data from the data source. A shortcut (e.g., a link, a url, or other computer navigable reference) may be placed in the data source. The shortcut may provide a navigable reference for a user to retrieve data from an archiving system if desired or necessary. The shortcut may also provide information about the archived data such as, for example, a subject, an extract of the archived data, a message header, and/or attributes associated with the archived data. Thus, a shortcut may allow an archival system to remove data without removing access to the data.

A tradeoff exists, however, between the amount of information provided by a shortcut and the size of the shortcut. Too little information may make archived data harder to find or may result in a user unnecessarily retrieving archived data to verify information. Too much information in a shortcut may reduce the space savings offered by the shortcut and add to the amount of storage required for the data source. Shortcuts for data sources such as email systems can use significant storage. Inefficient storage management of shortcuts may result in a requirement for extra storage space for a data source, deletion of shortcuts earlier than may be desirable, and other problems.

In view of the foregoing, it may be understood that there may be significant problems and shortcomings associated with current techniques for archiving data.

SUMMARY OF THE DISCLOSURE

Techniques for managing shortcut storage are disclosed. In one particular exemplary embodiment, the techniques may be realized as a computer implemented method for managing shortcut storage comprising identifying a shortcut in data storage, determining whether at least one attribute associated with the shortcut meets a specified criteria, modifying the shortcut in the event that the at least one attribute meets the specified criteria.

In accordance with other aspects of this particular exemplary embodiment, the at least one attribute associated with the shortcut may comprise a date associated with the shortcut.

In accordance with further aspects of this particular exemplary embodiment, the date may comprise at least one of: a date the shortcut was created, a date the shortcut was last accessed, and a date data referenced by the shortcut was accessed.

In accordance with additional aspects of this particular exemplary embodiment, the specified criteria may comprise a specified age.

In accordance with additional aspects of this particular exemplary embodiment, modifying the shortcut in the event that the at least one attribute meets the specified criteria may comprise removing one or more portions of the shortcut.

In accordance with additional aspects of this particular exemplary embodiment, the one or more portions may comprise at least one of: a portion of a message header associated with a shortcut and a portion of a message body associated with a shortcut.

In accordance with additional aspects of this particular exemplary embodiment, modifying the shortcut in the event that the at least one attribute meets the specified criteria may comprise deleting a portion of a shortcut referencing a file.

In accordance with additional aspects of this particular exemplary embodiment, the method may further comprise determining whether the at least one attribute associated with the shortcut meets one or more additional criteria.

In accordance with additional aspects of this particular exemplary embodiment, the additional criteria may specify two or more ranges of ages.

In accordance with additional aspects of this particular exemplary embodiment, modifying the shortcut may comprises a first modification to the shortcut in the event a date associated with a shortcut is in a first range of ages, and a second modification to the shortcut in the event the date associated with the shortcut is in a second range of ages.

In accordance with additional aspects of this particular exemplary embodiment, the at least one attribute associated with the shortcut may include a date associated with the shortcut and an identifier associated with one or more of: a user who last accessed the shortcut, a user who last accessed data represented by the shortcut, a user who created data referenced by shortcut, a group which last accessed the shortcut, a group which last accessed data associated with the shortcut, and a group who created data referenced by the shortcut.

In accordance with additional aspects of this particular exemplary embodiment, determining whether at least one attribute associated with the shortcut meets a specified criteria may be based at least in part on the identifier.

In accordance with additional aspects of this particular exemplary embodiment, the method may further comprise identifying a policy to apply, wherein the policy determines the specified criteria.

In accordance with additional aspects of this particular exemplary embodiment, the policy may be identified based at least in part on one or more of: a user identifier associated with the data storage, a group identifier associated with the data storage, an amount of data storage available, and an amount of data storage utilized by shortcuts.

In accordance with additional aspects of this particular exemplary embodiment, modifying the shortcut may comprise restoring one or more portions of the shortcut.

In accordance with additional aspects of this particular exemplary embodiment, the data storage may be associated with at least one of an email system and a file system.

In accordance with additional aspects of this particular exemplary embodiment, the shortcut may comprise a computer navigable reference to archived data.

In accordance with additional aspects of this particular exemplary embodiment, the techniques may be realized as at least one processor readable medium for storing a computer program of instructions configured to be readable by at least one processor for instructing the at least one processor to execute a computer process for performing the method.

In another particular exemplary embodiment, the techniques may be realized as an article of manufacture for managing shortcut storage, the article of manufacture comprising at least one processor readable medium, and instructions carried on the at least one medium, wherein the instructions are configured to be readable from the at least one medium by at least one processor. The instructions may thereby cause the at least one processor to operate so as to identify a shortcut in data storage, determine whether at least one attribute associated with the shortcut meets a specified criteria, and modify the shortcut in the event that the at least one attribute meets the specified criteria.

In yet another particular exemplary embodiment, the techniques may be realized as a system for managing shortcut storage comprising one or more processors communicatively coupled to a network. The one or more processors may be configured to identify a shortcut in data storage, determine whether at least one attribute associated with the shortcut meets a specified criteria, and modify the shortcut in the event that the at least one attribute meets the specified criteria.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
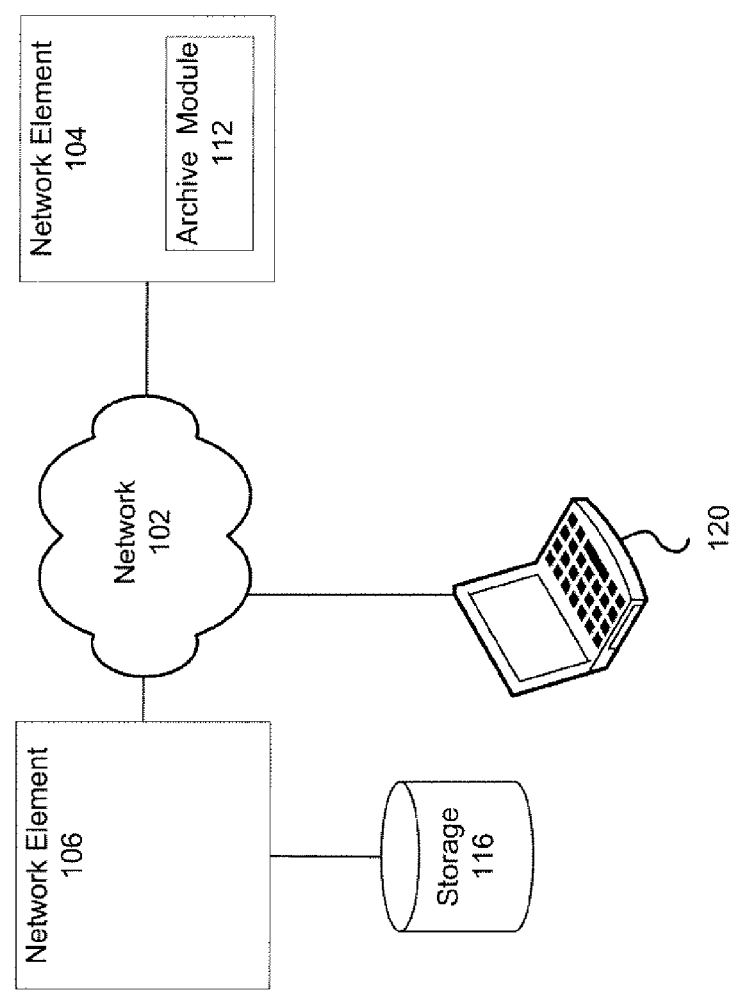
FIG. 1 shows a system for managing shortcut storage in accordance with an embodiment of the present disclosure.

Referring to FIG. 1, there is shown a system 100 for managing shortcut storage in accordance with an embodiment of the present disclosure. FIG. 1 is a simplified view of system 100, which may include additional elements that are not depicted. Network element 104 may be communicatively coupled to network 102. Network element 104 may contain shortcut management module 112. Computer 120 may be communicatively coupled to network 102. Storage 116 may be communicatively coupled to network element 106. Network element 106 may be communicatively coupled to network 102.

Network 102 may be a local area network (LAN), a wide area network (WAN), the Internet, a cellular network, a satellite network, or another network that permits communication between network elements 104 and 106, computer 120 and other devices communicatively coupled to network 102. Network 102 may further include one, or any number, of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although network 102 is depicted as one network, it should be appreciated that according to one or more embodiments, network 102 may comprise a plurality of interconnected networks.

Network elements 104 and 106 may be application servers, archival platforms, backup servers, network storage devices, media servers, email servers, document management platforms, enterprise search servers, or other devices communicatively coupled to network 102. Network elements 104 and 106 may utilize storage 116 for the storage of application data, backup data, or other data. Network elements 104 and 106 may be hosts, such as an application server, which may process data traveling between network elements 104 and 106 and a data archival platform, an archival process, and/or storage.

Computer 120 may be a desktop computer, a laptop computer, a server, or other computer. Computer 120 may receive data from user input, a database, a file, a web service, and/or an application programming interface. Computer 120 may query other systems and/or local or remote storage, such as network element 104 and storage 116. Computer 120 may provide a user interface to a backup system, an archival system, and/or a shortcut storage management system.

Storage 116 may be network accessible storage and may be local, remote, or a combination thereof to network element 104 and 106. Storage 116 may utilize a tape, disk, a storage area network (SAN), or other computer accessible storage. Storage 116 may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage.

Network element 106 may be one or more components and/or software for virtualizing storage. Although depicted as separate from storage 116, in one or more embodiments network element 106 may be integrated with storage 116 and may provide access to storage 116 as a virtualized storage platform.

According to some embodiments, network element 106 may be a platform used for archiving data. Network element 104 may be an email server, a document management platform (e.g., a Microsoft Sharepoint™ Server), or other data source utilizing archiving. One or more portions of data may be archived based on an archival policy applied, attributes associated with the data source, space available for archive, space available at the data source, or other factors. For example, network element 104 may be an email server and emails may be archived after a specified period of time.

The specified period of time may depend on an archive policy applied. Shortcut management module 112 may be an agent or another component associated with a shortcut management system which may scan and/or monitor shortcuts for compliance with rules associated with a shortcut management policy. Shortcut management module 112 may receive shortcut management policy information from a server administering a shortcut management system, a host or platform implementing a shortcut management system, a backup system, an archive management system, or another system. For example, network element 106 may contain an administrative interface for managing shortcut policy and may provide shortcut management policy information and other data to shortcut management module 112. The shortcut management policy applied may be determined in part by attributes associated with email such as, but not limited to, a user id associated with the email, a group id associated with the email, available storage on network element 104, and available storage for archiving on storage 116. For example, a data source mapped to a user identifier associated with an executive of a company may have a shortcut management policy applied that provides more storage for shortcuts and longer retention periods. Similarly, a data source associated with a group, such as a legal department, may have a shortcut management policy with longer retention periods. Some user identifiers or group identifiers may correspond to shorter retention periods.

More than one period of time or age of data may be evaluated when managing data storage. Data that is less than a first specified age may not be archived. Data that is greater than or equal to the first specified age may be archived and a shortcut may be created. Data that is greater than or equal to a second specified age may be archived with no shortcut, or if a shortcut is already created, the shortcut may be deleted.

Additional date ranges or ages may be utilized to determine the size of a shortcut. The date ranges or ages may be specified by a shortcut management policy. For example, a shortcut may contain several portions of the original email such as, for example, the email header, the subject, and a portion of the message body. If the shortcut is greater than 60 days old, the shortcut storage size may be reduced. For example, a first set of properties may be removed from the email. The first set of properties may include, for example, a portion of the message body. After 90 days a second set of properties may be removed. The second set of properties may include, for example, another portion of the message body, the remaining portion of the message body, and/or one or more properties of the message header. Thus, after 90 days the shortcut may contain a link to the archived message, a portion of the message header, and the subject. After 120 days the shortcut may be deleted. These date ranges or ages are exemplary and other ranges and reductions of data may be used.

According to some embodiments, other factors may be evaluated when managing shortcut storage. For example, available storage space on a data source, such as an email server, may be considered. If available space is less than desired, a shortcut management policy may shorten the ages or periods between reductions of shortcut size and/or may increase the size of the reductions (e.g., more of the message body may be deleted from an email in a first reduction). In some embodiments, the evaluation of available storage may consider an amount of the storage utilized by shortcuts. For example, if shortcuts represent more than a certain portion of overall storage on a server, then a more aggressive shortcut management policy may be applied. Alternatively, if the ratio of the number of shortcuts to the number of messages is at or above a certain level, then a more aggressive shortcut management policy may be applied.

A shortcut date may be based on one or more dates. For example, a shortcut date may be a date the shortcut was created, a date the shortcut was last accessed, and a date data referenced by the shortcut was last accessed. According to some embodiments, multiple shortcut dates may be utilized.

According to at least one embodiment, shortcut dates and/or shortcuts may be reset. For example, if a shortcut date is based upon a date a user last accessed the shortcut, when a user accesses a shortcut again, the date may be reset. As a specific example, if a shortcut to an archived email is to be reduced in size by the removal of a property (e.g., reduction in the amount of a message body stored with a shortcut for use as a preview) 60 days after the last access, the accessing of the shortcut by the user may delay the reduction another 60 days.

According to some embodiments, certain activity may restore one or more portions of a shortcut and/or the entire archived item. For example, if an email has been archived and a shortcut referencing the email contains a minimal amount of data (e.g., a subject and reference information) subsequent access may result in data being added to the shortcut or in the restoration of the archived item to a data source. The addition of data to a shortcut and/or the restoration of an archived item to a data source may depend on the type and/or amount of access to the item. For example, additional properties may be added to a shortcut if a user retrieves the item referenced by the shortcut, but not if the user only looks at the shortcut (e.g., double-clicks on a shortcut to retrieve an entire archived email referenced by the shortcut versus single clicks on an email to look at only the information currently associated with a shortcut). The amount of access to an item may be measured by the number of times a shortcut or an item the shortcut references is accessed. Additional properties added to a shortcut may include, for example, additional message header properties, additional message body data, additional file preview data, or other information.

If access or activity associated with a shortcut meets or exceeds specified criteria, the data referenced by the shortcut may be restored to the data source and the shortcut may be deleted (e.g., if an email is referenced via a shortcut more than a specified number of times, it may be restored to a mail server). Restoration of one or more properties of an archived item or of the archived item itself may be specified by a shortcut management policy. A shortcut management policy may consider an amount of available storage on a data source, an amount of storage required by the addition or restoration of a shortcut property, and other factors prior to the restoration or addition of shortcut data.

When considering access to a shortcut, a shortcut management method and/or system may evaluate not only the type and the amount of access, but also other criteria associated with the access. For example, a user who last accessed the shortcut, a user who last accessed data represented by the shortcut, a user who created data referenced by the shortcut, a group which last accessed the shortcut, a group which last accessed data associated with the shortcut, and a group who created data referenced by the shortcut may be evaluated. In this example, access to a shortcut, by someone other than a user identified as the owner of the shortcut, may not reset a shortcut date or restore shortcut properties. A shortcut management policy may specify the criteria used to identify when to add or restore data to a shortcut or when to restore an archived item.

According to one or more embodiments, a shortcut management policy may use one or more keywords in a determination of a retention period. For example, a keyword that is associated with a job function of a user identifier or a group identifier mapped to a portion of a data source, may provide a more conservative shortcut management policy (e.g., the periods between removal of shortcut properties and/or deletion of a shortcut may be longer or the number of properties removed may be fewer). As a specific example, if a user is associated with an accounting group and data being evaluated is associated with accounting, a more conservative shortcut management policy may be applied. Also, if a keyword mapped to a portion of a data source is mapped to a subject not related to the purpose of the data source (e.g., non work-related), a more aggressive archiving and shortcut management policy may be applied (e.g., the periods between removal of shortcut properties and/or deletion of a shortcut may be shorter, or the number of properties removed may be greater). As a specific example, if a portion of a data source contains one or more keywords or other indicators associating it with games, music, or sports, which are not associated with the primary purpose of the data source (e.g., an employer e-mail system), a more aggressive shortcut management policy may be applied.

According to some embodiments, a user may be prompted for confirmation of one or more shortcut modification actions. For example, a user may be provided with an interface or a report listing possible shortcut modifications. For example, a user may be an administrator and they may confirm the actions.

Figure 2:
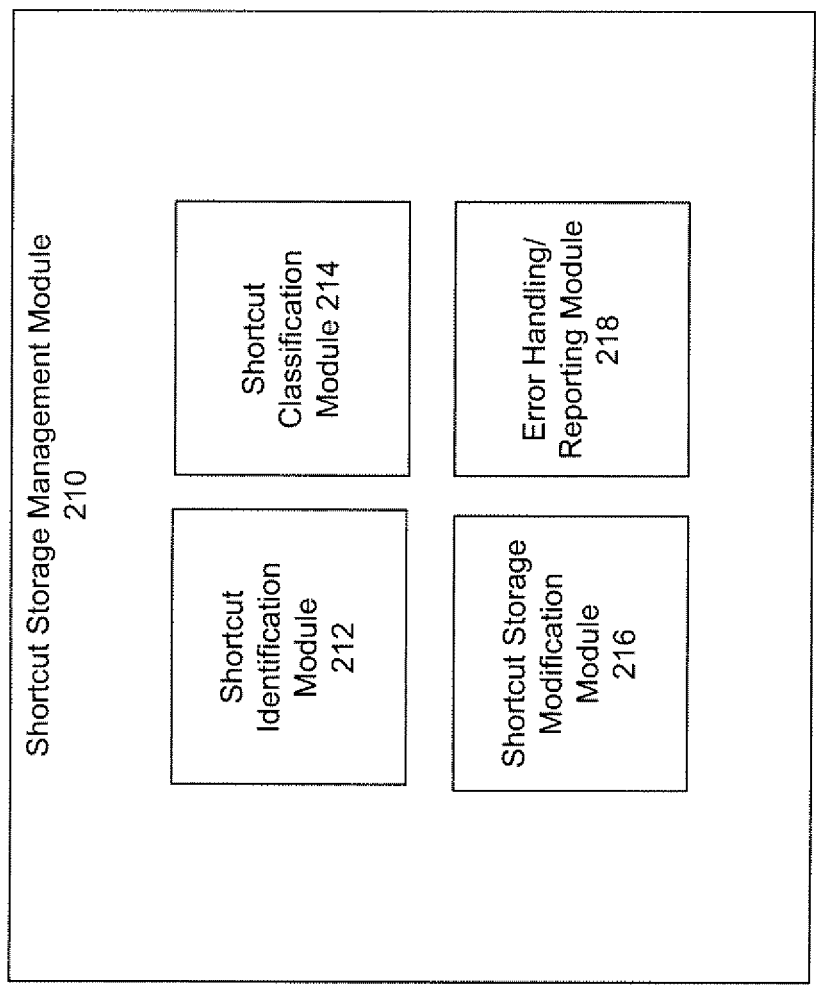
FIG. 2 shows a module for managing shortcut storage in accordance with an embodiment of the present disclosure.

Referring to FIG. 2, there is shown a shortcut storage management module 210 in accordance with an embodiment of the present disclosure. As illustrated, the shortcut storage management module 210 may contain one or more components including a shortcut identification module 212, a shortcut classification module 214, a shortcut storage modification module 216, and an error handling/reporting module 218.

The description below describes network elements, computers, and/or components of a system and method for shortcut storage management that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Shortcut identification module 212 may identify one or more shortcuts in a data source. For example, shortcut identification module 212 may review a data source such as an email system to identify one or more shortcuts. According to some embodiments, shortcut identification module 212 may identify one or more portions of data for which shortcuts may be created. Shortcut identification module 212 may identify shortcuts for an entire data source or for a portion of a data source corresponding to one or more attributes. For example, shortcut identification module 212 may identify shortcuts for an entire email system, for a portion of an email system corresponding to a server or a unit of storage, for a portion of an email system corresponding to a user or a group, or for other specified portions. According to some embodiments, shortcut identification module 212 may identify shortcuts using a grouping or sorting of a data source. For example, shortcut identification module 212 may identify shortcuts for an oldest portion of a data source first. Shortcut identification module 212 may provide shortcut identification data to shortcut classification module 214.

Shortcut classification module 214 may classify one or more identified shortcuts according to specified criteria. For example, shortcut classification module 214 may apply one or more archive or shortcut management policies to identified shortcuts. Shortcut classification module 214 may determine one or more actions to be performed against shortcuts or other storage. Shortcut classification module 214 may identify reductions in shortcut properties, additions to shortcut properties, deletions of shortcuts to be performed, and creations of shortcuts to be performed. Shortcut classification module 214 may utilize archive policies to identify criteria for classifying a shortcut such as, for example, user attributes associated with a shortcut, group attributes associated with a shortcut, available storage associated with a shortcut (e.g., available storage on a mail server or a file server), keywords associated with a shortcut, and dates associated with a shortcut. Dates associated with a shortcut may include a date the shortcut was created, a date the shortcut was last accessed, and a date the data referenced by the shortcut was accessed. According to some embodiments, multiple shortcut dates may be utilized.

Shortcut classification module 214 may pass or provide classification data to shortcut storage modification module 216. According to some embodiments, shortcut classification module 214 may set one or more flags or attributes for shortcut storage modification module 216. Attributes may be set according to a type of storage modification to be performed. For example, a first flag may be set if a shortcut is to have a first set of properties removed, a second flag or attribute may be set if a shortcut is to have a second set of properties or attributes removed, a third flag may be set if a shortcut is to be deleted, and a fourth flag may be set if a shortcut is to be increased in size.

Shortcut storage modification module 216 may receive classification data from shortcut classification module 214 and may perform one or more actions. Shortcut storage modification module 216 may remove one or more properties of a shortcut to decrease storage size. Shortcut storage modification module 216 may also delete a shortcut and increase the size of a shortcut.

Error handling/reporting module 218 may handle errors associated with shortcut identification, shortcut classification, shortcut storage modification, and other processes. Error handling/reporting module 218 may log errors, such as errors occurring during shortcut storage modification. Error handling/reporting module 218 may provide prompts, reports, and/or user interfaces for handling errors.

Figure 3:
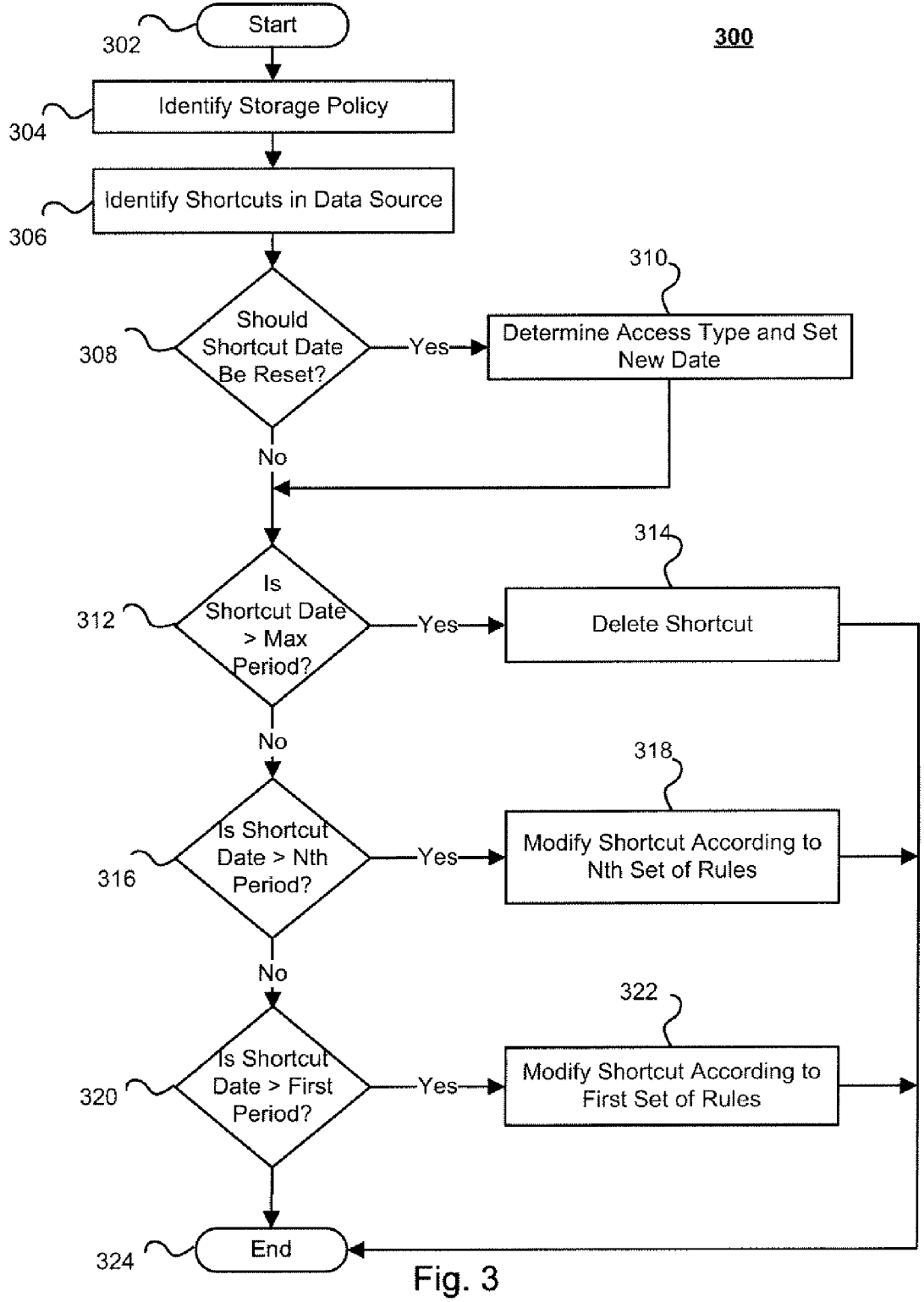
FIG. 3 depicts a method for managing shortcut storage in accordance with an embodiment of the present disclosure.

Referring to FIG. 3, there is depicted a method 300 for managing shortcut storage in accordance with an embodiment of the present disclosure. At block 302, the method 300 may begin.

At block 304, one or more storage policies may be identified. For example, a shortcut management policy for managing shortcut storage may be identified by a user id associated with a data source, a group id associated with a data source, a type of data source, or other attributes. A user id associated with an account on a file server or an email server may be used to determine a shortcut management policy. According to some embodiments, a default shortcut management policy may be used.

At block 306, one or more shortcuts may be identified in a data source. Identified shortcuts may be shortcuts which are associated with a data source, with a user, with a group, shortcuts older than a specified date, or another grouping of shortcuts.

At block 308, a determination as to whether a shortcut date should be reset may be made. According to some embodiments, a shortcut date may be a file or storage date which may be maintained by a file system. A user or administrator may also choose to reset a shortcut date. For example, a user may adjust a shortcut date to a current date so that a shortcut is not reduced or eliminated. According to one or more embodiments, a shortcut date may be a separate date and/or a date based on a file system or storage system date. Dates associated with a shortcut may include a date the shortcut was created, a date the shortcut was last accessed, and a date the data referenced by the shortcut was accessed. According to some embodiments, multiple shortcut dates may be utilized. If a shortcut date is separate from a file system date and a file system date is modified, a shortcut date may need to be reset. For example, if a shortcut date is based on a date the shortcut was last accessed and the file system date is more recent than the shortcut date, the shortcut date may be reset to the more recent file system date. If a shortcut date is to be reset, the method 300 may continue at block 310. If a shortcut date is not to be reset, the method 300 may continue at block 312.

At block 310, the shortcut date may be reset. According to some embodiments, an access type may be determined in order to reset the shortcut date. For example, multiple shortcut dates may be used and the type of access may be used to reset a shortcut date. A first shortcut date may be associated with a date a shortcut was last accessed. A second shortcut date may be associated with a date data referenced by a shortcut was last accessed. After resetting a shortcut date, the method 300 may continue at block 312.

At block 312, a determination as to whether a shortcut date is greater than a maximum specified period may be made. The maximum specified period may be specified by a shortcut management policy. If a shortcut date is greater than a maximum specified period, the method 300 may continue at block 314. If a shortcut date is not greater than a maximum specified period, the method 300 may continue at block 316.

At block 314, the shortcut may be deleted.

At block 316, a determination as to whether a shortcut date is greater than an "n"th period may be made. For example, multiple periods or age ranges may be used in managing shortcut storage. Each period may be associated with a different level of storage and/or shortcut detail. For example, as a shortcut ages, less detail and/or data may be associated with a storage. This may enable shortcuts to shrink as they get older. In some embodiments, if a shortcut is accessed it may reset the shortcut date so that the time until shortcut storage is reduced is reset. For example, if a shortcut is 50 days old and shortcuts are reduced at 60 days, accessing a shortcut may reset the shortcut date to the date of access. This may provide another 60 days from the date of access until the shortcut is reduced. In one or more embodiments, if a shortcut is accessed, the shortcut may have additional data and/or data restored to it. If a shortcut date is greater than an "n"th period, the method 300 may continue at block 318. If a shortcut date is not greater than an "n"th period, the method 300 may continue at block 320.

At block 318, a shortcut may be modified according to a set of rules associated with the "n"th period. For example, an "n"th period may be a second range of ages corresponding to shortcuts that are more that 180 days old but less than 360 days old. For these shortcuts, the shortcut may be reduced to only a message header, a subject, and a link to the corresponding archived data.

At block 320, a determination as to whether a shortcut date is greater than a first period may be made. For example, a first period may be 120 days. If a shortcut date is greater than a first period, the method 300 may continue at block 322. If a shortcut date is not greater than a first period, the method may end at block 324. For example, a shortcut may be for an email that was last accessed 100 days ago in a system using a first period of 120 days to 179 days. In this example, the shortcut date may be the last access date for the shortcut. Because the email was accessed more recently than 120 days ago, the shortcut may not be modified.

At block 322, a shortcut may be modified according to a first set of rules. The set of rules may be specified by a shortcut management policy. For example, a shortcut management policy may specify an amount of data to be removed from a shortcut. In a shortcut storage management system managing shortcuts of an email system, the properties removed may include one or more portions of a message body.

At block 324, the method 300 may end.

At this point it should be noted that managing shortcut storage in accordance with the present disclosure as described above typically involves the processing of input data and the generation of output data to some extent. This input data processing and output data generation may be implemented in hardware or software. For example, specific electronic components may be employed in a module for managing shortcut storage or similar or related circuitry for implementing the functions associated with managing shortcut storage in accordance with the present disclosure as described above. Alternatively, one or more processors operating in accordance with instructions may implement the functions associated with managing shortcut storage in accordance with the present disclosure as described above. If such is the case, it is within the scope of the present disclosure that such instructions may be stored on one or more processor readable media (e.g., a magnetic disk, magnetic tape, optical media, or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer implemented method for managing shortcut storage comprising:
   identifying a shortcut in data storage, wherein the shortcut is a computer navigable reference to archived data;
   determining, using at least one computer processor, whether at least one attribute associated with the shortcut meets a specified criteria; and
   modifying the shortcut in the event that the at least one attribute meets the specified criteria, wherein modification of the shortcut comprises managing a storage size of the shortcut based on the determination, wherein modification of the shortcut also comprises restoring one or more portions of the shortcut from the archived data into the shortcut in data storage, wherein restoring one or more portions of the shortcut comprises restoring into the shortcut one or more portions of an archived item referenced by the shortcut, and wherein an amount of data restored to the shortcut depends on at least one of a type of access to an item referenced by the shortcut and an amount of access to the shortcut.

2. The computer implemented method of claim 1, wherein the at least one attribute associated with the shortcut comprises a date associated with the shortcut.

3. The computer implemented method of claim 2, wherein the date comprises at least one of: a date the shortcut was created, a date the shortcut was last accessed, and a date data referenced by the shortcut was accessed.

4. The computer implemented method of claim 2, wherein the specified criteria comprises a specified age.

5. The computer implemented method of claim 1, wherein modifying the shortcut in the event that the at least one attribute meets the specified criteria comprises removing one or more portions of the shortcut.

6. The computer implemented method of claim 5, wherein the one or more portions comprises at least one of: a portion of a message header associated with a shortcut and a portion of a message body associated with a shortcut.

7. The computer implemented method of claim 1, wherein modifying the shortcut in the event that the at least one attribute meets the specified criteria comprises deleting a portion of a shortcut referencing a file.

8. The computer implemented method of claim 1, further comprising determining whether the at least one attribute associated with the shortcut meets one or more additional criteria.

9. The computer implemented method of claim 8, wherein the additional criteria specify two or more ranges of ages.

10. The computer implemented method of claim 9, wherein modifying the shortcut comprises:
a first modification to the shortcut in the event a date associated with a shortcut is in a first range of ages; and
a second modification to the shortcut in the event the date associated with the shortcut is in a second range of ages.

11. The computer implemented method of claim 1, wherein the at least one attribute associated with the shortcut includes a date associated with the shortcut and an identifier associated with one or more of: a user who last accessed the shortcut, a user who last accessed data represented by the shortcut, a user who created data referenced by shortcut, a group which last accessed the shortcut, a group which last accessed data associated with the shortcut, and a group who created data referenced by the shortcut.

12. The computer implemented method of claim 11, wherein determining whether at least one attribute associated with the shortcut meets a specified criteria is based at least in part on the identifier.

13. The computer implemented method of claim 1, further comprising identifying a policy to apply, wherein the policy determines the specified criteria.

14. The computer implemented method of claim 13, wherein the policy is identified based at least in part on one or more of: a user identifier associated with the data storage, a group identifier associated with the data storage, an amount of data storage available, and an amount of data storage utilized by shortcuts.

15. The computer implemented method of claim 1, wherein the data storage is associated with at least one of an email system and a file system.

16. At least one processor readable medium for storing a computer program of instructions configured to be readable by at least one processor for instructing the at least one processor to execute a computer process for performing the method as recited in claim 1.

17. An article of manufacture for managing shortcut storage, the article of manufacture comprising:
at least one non-transitory processor readable storage medium; and
instructions carried on the at least one medium;
wherein the instructions are configured to be readable from the at least one medium by at least one processor and thereby cause the at least one processor to operate so as to:
identify a shortcut in data storage, wherein the shortcut is a computer navigable reference to archived data;
determine whether at least one attribute associated with the shortcut meets a specified criteria; and
modify the shortcut in the event that the at least one attribute meets the specified criteria, wherein modification of the shortcut comprises managing a storage size of the shortcut based on the determination, wherein modification of the shortcut also comprises restoring one or more portions of the shortcut from the archived data into the shortcut in data storage, wherein restoring one or more portions of the shortcut comprises restoring into the shortcut one or more portions of an archived item referenced by the shortcut, and wherein an amount of data restored to the shortcut depends on at least one of a type of access to an item referenced by the shortcut and an amount of access to the shortcut.

18. A system for managing shortcut storage comprising:
one or more processors communicatively coupled to a network; wherein the one or more processors are configured to:
identify a shortcut in data storage, wherein the shortcut is a computer navigable reference to archived data;
determine whether at least one attribute associated with the shortcut meets a specified criteria; and
modify the shortcut in the event that the at least one attribute meets the specified criteria, wherein modification of the shortcut comprises managing a storage size of the shortcut based on the determination, wherein modification of the shortcut also comprises restoring one or more portions of the shortcut from the archived data into the shortcut in data storage, wherein restoring one or more portions of the shortcut comprises restoring into the shortcut one or more portions of an archived item referenced by the shortcut, and wherein an amount of data restored to the shortcut depends on at least one of a type of access to an item referenced by the shortcut and an amount of access to the shortcut.

19. The computer implemented method of claim 1, wherein the amount of data restored to the shortcut depends on at least one of: a user who last accessed the shortcut, a user who last accessed data represented by the shortcut, a user who created data referenced by the shortcut, a group which last accessed the shortcut, a group which last accessed data associated with the shortcut, and a group who created data referenced by the shortcut.

20. The computer implemented method of claim 1, wherein type of access to the item referenced by the shortcut comprises at least one of: retrieving the item referenced by the shortcut and viewing information currently associated with the shortcut.

* * * * *